United States Patent

[11] 3,607,136

| [72] | Inventors | Robert A. Smiley<br>Wilmington, Del.;<br>John A. Vernon, Haddonfield, N.J. |
|---|---|---|
| [21] | Appl. No. | 850,435 |
| [22] | Filed | Aug. 15, 1969 |
| [45] | Patented | Sept. 21, 1971 |
| [73] | Assignee | E. I. du Pont de Nemours and Company<br>Wilmington, Del. |

[54] RECOVERY OF AMMONIUM SULFATE
5 Claims, 1 Drawing Fig.

[52] U.S. Cl. .................................................... 23/299,
23/312 A, 23/119, 23/302
[51] Int. Cl. ........................................................... B01d 11/04,
B01d 9/02, C01c 1/24
[50] Field of Search .......................................... 23/312 R,
312 A, 119, 299, 302, 300, 296, 297; 260/465.5,
534.5, 465.9

[56] References Cited
UNITED STATES PATENTS

| 2,443,391 | 6/1948 | Kirkpatrick | 260/534 S |
| 2,485,236 | 10/1949 | Gresham | 260/465.5 |
| 2,504,425 | 4/1950 | Kralovec | 260/465.5 X |
| 3,211,631 | 10/1965 | Fuchs | 23/312 A |
| 3,271,105 | 9/1966 | Runge | 23/312 A |
| 3,305,308 | 2/1967 | Sennewald | 260/465.9 X |
| 3,468,624 | 9/1969 | Miller | 260/465.9 X |
| 3,489,512 | 1/1970 | Okuno | 23/119 |

FOREIGN PATENTS

| 629,711 | 3/1963 | Belgium | 23/312 A |

Primary Examiner—Norman Yudkoff
Assistant Examiner—S. J. Emery
Attorney—James J. Flynn

ABSTRACT: Contacting an aqueous solution of ammonium sulfate contaminated with organic solvent-soluble impurities with a liquid organic nitrile in order to extract impurities from the aqueous solution, and recovering crystalline ammonium sulfate.

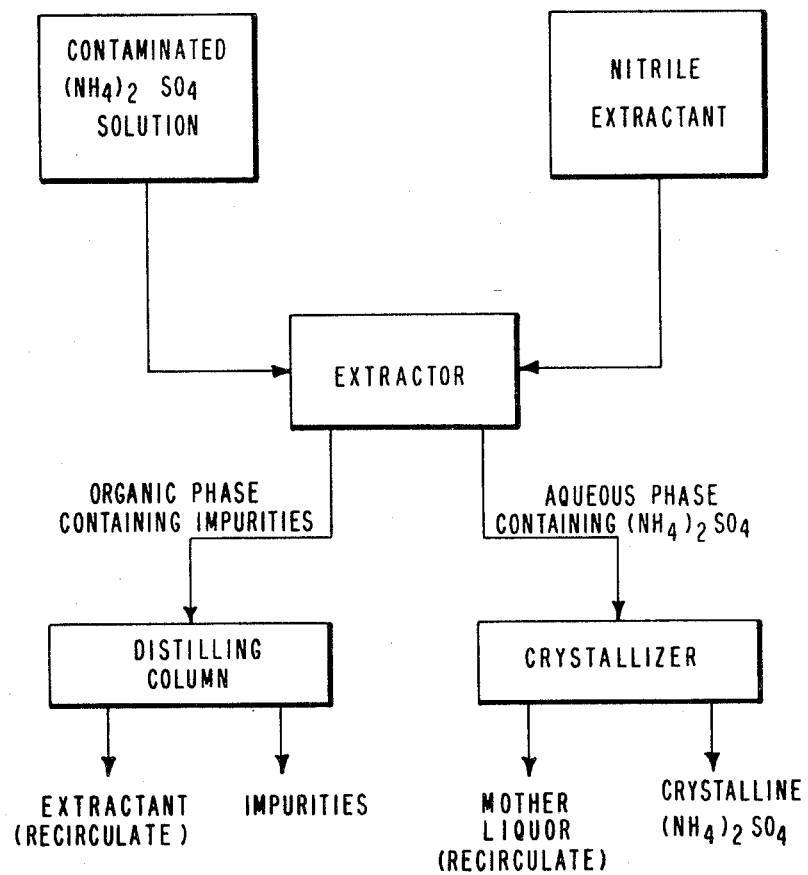

RECOVERY OF AMMONIUM SULFATE

BACKGROUND OF THE INVENTION

This invention relates to a process for recovering purified ammonium sulfate.

Ammonium sulfate solution is produced as a byproduct in substantial quantity in a number of industrial, organic chemical processes. However, the ammonium sulfate recovered from such solutions often contains organic impurities that preclude its use where substantially pure ammonium sulfate is required; for example, fertilizer-grade ammonium sulfate generally has a nitrogen content of at least about 20.5 percent, i.e. 96 percent purity. More specifically, in the manufacture of acrylonitrile by a gaseous phase catalytic reaction of propylene, ammonia and a molecular oxygen-containing gas, i.e., by ammoxidation of propylene, reactor effluent gases are cooled and quenched in water into which is injected sulfuric acid that reacts with the unconverted ammonia to form ammonium sulfate. The neutralization of ammonia by sulfuric acid in the process is necessary, otherwise the ammonia will react with the acrylonitrile thus causing a substantial loss of the desired end product. Heretofore, the resulting contaminated ammonium sulfate solution containing organic impurities was combined with other aqueous process streams, and the combined stream was fed to a waste water distilling column. Overheads from this column were recycled to a quench column to recover HCN and acrylonitrile values and byproduct acetonitrile. Bottoms from the waste water distilling column were combined with other aqueous streams, and the resulting ammonium sulfate solution, that was heavily contaminated with higher boiling organic residues, including polymerization, condensation, and other reaction products, was disposed of in a gas-fired incinerator. Such a procedure is described in detail in, for example, U.S. Pat. No. 3,404,947. This procedure is expensive, and in addition is wasteful since ammonium sulfate is destroyed. Equally important is the fact that the procedure results in the emission of stack gases carrying objectionable concentrations of sulfur dioxide and sulfur trioxide as air pollutants. The present invention provides an economical and effective process for recovering purified crystalline ammonium sulfate from the waste material before disposal, e.g. by incineration. Furthermore, by following the teachings of this invention the total plant incineration load is greatly reduced by the removal and recovery of ammonium sulfate. In addition, utilizing the process of this invention has the beneficial and significant effect of substantially eliminating noxious air pollutants, sulfur dioxide and sulfur trioxide fumes, from the stack gas effluent of the incinerator. Although the procedure lends itself quite readily to the purification of ammonium sulfate produced as a byproduct in the manufacture of acrylonitrile and derivatives thereof, as described above, ammonium sulfate solutions contaminated with organic impurities from other sources can be purified and the ammonium sulfate recovered following the teachings of this invention. For example, ammonium sulfate solution formed as a byproduct in the manufacture of caprolactam, in the processing of coal gas, in the treatment of oil refinery waste acid sludge and in the manufacture of methacrylic acid and its derivatives can be purified before recovery of crystalline ammonium sulfate by treating the contaminated ammonium sulfate solution according to the process of this invention.

DESCRIPTION OF THE INVENTION

It has been discovered that an ammonium sulfate solution containing organic impurities can be treated by an extraction process to remove impurities therefrom, so that purified crystalline ammonium sulfate can be recovered. The process of this invention involves intimately contacting an aqueous solution of at least about 10 percent ammonium sulfate containing organic nitrile-soluble impurities with a liquid organic nitrile of the formula RCN wherein R is an organic radical having from 1 to 7 carbon atoms, said nitrile being present in an amount sufficient to form an organic phase and an aqueous phase, and maintaining the phases in a liquid state so as to extract organic impurities from the aqueous phase by means of the nitrile extractant and separating the phases. Crystalline ammonium sulfate is recovered from the purified aqueous phase. Generally, the weight of nitrile extractant used is at least about 0.05, and preferably is about 0.10 and most preferably about 0.15, of the weight of the contaminated aqueous ammonium sulfate solution being treated. Ammonium sulfate recovered by this process is useful as an ingredient in the manufacture of fertilizer compositions because its nitrogen content is not less than about 20.5 percent. Furthermore, when ammonium sulfate, produced as a byproduct, e.g., in the ammoxidation of propylene, is purified and recovered by the present process, noxious sulfur dioxide and trioxide air pollutants are largely eliminated from stack gases of waste incinerators.

For a clearer understanding of the invention, attention is directed to the drawing showing a flowsheet of the process. As can be seen from the flowsheet, a supply of aqueous ammonium sulfate that contains organic contaminants is contained in a holding vessel, and liquid organic nitrile that functions as the extractant is contained in a separate vessel. These materials are circulated to and mixed in an extractor. An extraction apparatus, such as a batch mixer-settler or a continuous countercurrent flow column, receives the contaminated ammonium sulfate solution and the liquid organic nitrile extractant, wherein the ingredients are intimately contacted, then separated into an aqueous phase and an organic phase. The organic solvent-soluble impurities in the aqueous ammonium sulfate solution are extracted therefrom into the organic phase by the solvent action of the liquid nitrile extractant, and the ammonium sulfate remains in solution. The extracted, purified, aqueous ammonium sulfate solution, i.e., the raffinate, is delivered to a crystallizer for crystallization and precipitation of solid ammonium sulfate. The mother liquor is separated from the crystalline ammonium sulfate and, preferably, is reused in the system as a vehicle for collecting and transporting additional amounts of contaminated ammonium sulfate. The organic phase, containing liquid organic nitrile and extracted impurities, is circulated to a distilling column where the nitrile extractant is separated from the impurities and returned to the storage vessel for reuse in the process. The remaining impurities can be disposed of by, for example, incinerating, with little or no emission of noxious sulfur dioxide or trioxide fumes into the atmosphere.

PREFERRED EMBODIMENTS OF THE INVENTION

Aqueous ammonium sulfate solutions contaminated with organic impurities from any source can be treated for purification, according to the process of this invention. The contaminated aqueous ammonium sulfate solution generally contains at least 10 percent, preferably at least about 30 percent, by weight of ammonium sulfate. The ammonium sulfate solution that is treated is substantially neutral, that is it has a pH in the range of about from 2 to 8. The pH of the aqueous ammonium sulfate solution can be adjusted by conventional means, e.g., the addition of sulfuric acid or of ammonia, as required, to bring the solution to the above-mentioned pH range or, preferably, to a pH of about 4 to 6. As mentioned above, this invention readily lends itself to the purification of contaminated ammonium sulfate made as a byproduct by quenching and neutralizing the reactor off gases produced in the manufacture of acrylonitrile, methacrylonitrile, or benzonitrile by ammoxidation of propylene, isobutylene and toluene, respectively. However, other ammonium sulfate solutions contaminated with organic impurities that are soluble in the liquid organic nitrile can be purified by the present process. For example, contaminated byproduct ammonium sulfate solution formed in the production of caprolactam, as disclosed in U.S. Pat. No. 2,973,355, or obtained in the byproduct coking of coal, as disclosed in U.S. Pat. No. 1,274,999, or from petroleum acid sludge, as disclosed in U.S.

Pat. No. 2,331,235, or by neutralizing waste sulfuric acid obtained in the production of methacrylates, as disclosed in U.S. Pat. No. 2,101,821, can be purified and recovered by the process of this invention.

Removal of organic contaminants from the ammonium sulfate solution by extraction with a liquid organic nitrile can be carried out in any suitable liquid-liquid extraction apparatus such as, for example, a batch or continuous mixer-settler or a continuous countercurrent flow column. In any case, the aqueous solution of ammonium sulfate containing organic impurities and the liquid organic nitrile extractant in an amount sufficient to form an organic phase and an aqueous phase are intimately mixed for extraction of the impurities from the aqueous ammonium sulfate solution. The minimum amount of liquid organic nitrile that can be used in the extraction step is, generally, that which permits the formation of an organic phase and an aqueous phase so that the two phases that are formed are, subsequently, easily separated. Generally, the weight of liquid nitrile added is at least about 0.05 and generally not more than about 5.0 times, the weight of the contaminated aqueous ammonium sulfate solution being treated. Larger quantities of nitrile extractant can be used in the process, but such usage imposes an economic burden on the process due to the cost of recovering the nitrile extractant for reuse.

Any liquid organic nitrile, or mixtures thereof, that are solvents for the organic impurities in the ammonium sulfate solution, can be used as an extractant in the process of this invention. Preferably, the organic nitrile can be represented by the formula RCN in which R is a monovalent organic radical of 1 to 7 carbon atoms, and, most preferably, an unsubstituted hydrocarbon radical, especially a monovalent alkyl, alkenyl or aryl radical. Generally, the liquid organic nitriles have boiling points below about 220° C. Representative liquid organic nitrile extractants include acetonitrile, propionitrile, butyronitrile, hexanoic acid nitrile, octanoic acid nitrile, isobutyronitrile, acrylonitrile, crotononitrile, pentenoic acid nitrile, benzonitrile and ortho- or metatolunitrile Acetonitrile is especially preferred as the extractant in the process of this invention because it is especially effective as an extractant, is available at low cost as a byproduct in the ammoxidation of, e.g., propylene, and its use avoids introduction of another and different liquid into the system.

During the extraction step when the liquid organic nitrile extractant is contacted with the contaminated aqueous ammonium sulfate, it is important to maintain the materials in a liquid state. Therefore, when high temperatures are used, superatmospheric pressure can be applied in order to hold the volatile liquid organic nitrile, e.g., acetonitrile or propionitrile, in a liquid state in the system. Generally, the extraction step is carried out at a temperature of about from 10° C. to just below about the boiling point of the mixture at operating pressure. Most preferably, extraction of impurities is carried out at atmospheric pressure at just below the boiling point of the mixture, for example, at about 75° to 80° C. when acetonitrile is used as extractant.

After the liquid organic nitrile is mixed with and removes organic contaminants from the aqueous ammonium sulfate solution, the two phases are separated. Generally, in a mixer-settler-type apparatus, the aqueous phase separates from the organic phase by settling. Thus, under the action of gravity two layers are formed and the aqueous phase containing the purified ammonium sulfate solution is the more dense and, consequently, the lower of the two layers. Other means of separating the aqueous phase from the organic phase, such as by centrifugal force, can also be used. The purified ammonium sulfate solution after separation from the organic phase is crystallized. Crystallization can be accomplished by any conventional procedure, for example, concentrating and cooling the solution of ammonium sulfate, or, preferably, crystallizing in an evaporative-type crystallizer. If the former procedure is used, the recovered mother liquor can be, and preferably is, reused in the process, thereby obtaining substantially complete recovery of solid ammonium sulfate. The solid, crystalline ammonium sulfate usually is dried in a conventional manner before being stored or packaged for shipment.

The organic phase containing liquid organic nitrile and impurities is treated to recover the organic nitrile for reuse in the process. This is usually accomplished by distillation of the organic layer by conventional means to recover the organic nitrile for reuse.

The following examples illustrate the invention in detail. The term "parts" refers to measurements on a weight basis.

EXAMPLE 1

Column bottoms obtained in the manufacture of acrylonitrile by the ammoxidation of propylene was concentrated by distilling until the mixture contained about 34.5 percent by weight of ammonium sulfate and had about 5.1 percent nonvolatile organic contaminants.

One hundred seventy-five cc. of this solution (density about 1.196 g./cc.) was mixed with 160 cc. of the liquid organic nitrile, acetonitrile (density about 0.786), and vigorously agitated at 75° C. for about 2 minutes at atmospheric pressure in a mixer-settler apparatus, thereby intimately mixing the ingredients. The addition of acetonitrile to the aqueous solution of contaminated ammonium sulfate resulted in the formation of an aqueous phase containing dissolved ammonium sulfate and an organic phase containing acetonitrile. The ratio of the weight of acetonitrile to the weight of contaminated ammonium sulfate solution was about 0.6. After stirring, the mixture was allowed to settle and in about 3 minutes two distinct layers were formed, namely, an aqueous layer containing purified ammonium sulfate in solution and an organic layer containing acetonitrile and dissolved impurities. The lower aqueous layer was separated from the supernatant organic layer by use of a separatory funnel. The aqueous layer containing the ammonium sulfate was concentrated by distilling off about 50 cc. of water during which time ammonium sulfate began to separate. The resulting mixture was cooled to 40° C., and crystalline ammonium sulfate was separated by filtration and dried at 125° C. for about 2 hours. The recovered purified ammonium sulfate contained 20.8 percent nitrogen, thus being about 98.2 percent pure.

On the other hand, when a sample of the above-mentioned solution containing 34.5 percent ammonium sulfate was concentrated and crystallized, but without prior purification by extraction with acetonitrile, the recovered ammonium sulfate contained only 17.5 percent nitrogen, thus being about only 82.5 percent pure.

EXAMPLE 2

The procedure described in example 1 was repeated, except that the contaminated ammonium sulfate solution was extracted with four successive 160 cc. portions of acetonitrile. The resulting dried crystalline ammonium sulfate contained 21 percent nitrogen, thus being 99.1 percent pure.

EXAMPLES 3 TO 5

The procedure described in example 1 was repeated, except that the liquid organic nitrile extractants used were (a) propionitrile, (b) acrylonitrile and (c) benzonitrile in place of acetonitrile in weight ratios of 0.59, 0.62, and 1.3, respectively. The nitrogen content of the purified crystalline ammonium sulfate recovered from solution treated with propionitrile was about 20 percent, with acrylonitrile about 20.6 percent, and benzonitrile about 20.2 percent. This indicated that a distinct improvement in purity of the contaminated ammonium sulfate solution was achieved in each of these examples, even with a single extraction step.

EXAMPLE 6

A contaminated ammonium sulfate solution made up of waste-water column bottoms from the acrylonitrile plant and recycled mother liquor (from a prior crystallization) contains about 51.4 percent water, 38.6 percent sulfate, 9.7 percent organic contaminants, and 0.3 percent hydrogen cyanide. About 26,000 pounds of this solution, at about 104° C., is extracted in two successive countercurrent stages, in a mixer-settler equipment, with about 5,000 lbs. of recycled acetonitrile entering at about 45° C. (approximately 80 percent acetonitrile, 18 percent water and 2 percent hydrogen cyanide). The overall ratio of acetonitrile/ammonium sulfate solution is about 0.149. The resulting extracted ammonium sulfate solution is fed to an evaporative-type crystallizer and gives about 5,315 pounds of commercial grade dried crystalline ammonium sulfate having a purity (nitrogen basis) of about 97 percent. This example illustrates further that recovered acetonitrile containing water can be used as extractant in the process of this invention, provided that the ammonium sulfate concentration in the resulting aqueous solution remains above 10 percent.

EXAMPLE 7

One hundred parts of a caprolactam-sulfuric acid mixture containing about 60 percent sulfuric acid and 40 percent of crude caprolactam (made by rearrangement of cyclohexanone oxime in +100 percent sulfuric acid) is drowned, with cooling, in about 150 parts of saturated ammonium sulfate solution, the resulting solution is neutralized with 20 percent ammonium hydroxide solution (contains about 9.7 percent $NH_3$) to a pH of about 8. The upper layer, predominantly $\epsilon$-caprolactam, is separated from the lower layer of ammonium sulfate solution containing caprolactam and some tarry organic material. The aqueous ammonium sulfate solution (about 425 parts at about 37 percent concentration, containing about 5 parts of caprolactum) is concentrated by distillation until the ammonium sulfate concentration is about 45 percent. This solution is extracted with acetonitrile following the procedure of example 1 above. Crystalline ammonium sulfate of adequate purity is obtained from the extracted aqueous solution, acetonitrile is recovered by distillation of the organic layer, and the residual caprolactam is combined for further processing with the principal amount of $\epsilon$-caprolactam separated above after neutralizing the sulfuric acid.

EXAMPLE 8

A solution containing 23.5 percent ammonium sulfate, 35.8 percent sulfuric acid, 30.8 percent water, 8.4 percent diammonium-1,3-propanone-disulfonate and 1.5 percent organic compounds having the empirical formula $C_5H_{10}O_3$ is obtained as a byproduct in the preparation of methyl methacrylate. The contaminated solution containing ammonium sulfate is diluted with water and neutralized with ammonia to a pH of about 4 so as to obtain a solution containing about 40 percent, by weight, of ammonium sulfate. This contaminated aqueous solution of ammonium sulfate is treated according to the procedure in example 1, and purified crystalline ammonium sulfate is obtained that contains 20.5 percent by weight nitrogen.

EXAMPLE 9

Ammoniated sulfuric acid waste liquor, derived in a process of separating $m$- and $p$-xylene by sulfuric acid, containing 42.6 percent ammonium sulfate, 9 percent ammonium xylene sulfonates and 48.4 percent water is treated according to the procedure described in example 1. and purified crystalline ammonium sulfate is obtained containing more than 20.5 percent nitrogen.

I claim:

1. In a process for recovering purified ammonium sulfate from a contaminated aqueous ammonium sulfate solution containing at least about 10 percent ammonium sulfate and organic nitrile-soluble impurities, the improvement which comprises intimately contacting said aqueous solution of ammonium sulfate containing said organic impurities with acetonitrile, said nitrile being present in an amount sufficient to form an organic phase and an aqueous phase, maintaining said phases in a liquid state so as to extract said organic impurities from the aqueous phase by means of the nitrile and separating the phases.

2. The process of claim 1 wherein the weight of acetonitrile employed is at least about 0.05 of the weight of the aqueous ammonium sulfate solution to be purified.

3. The process of claim 2 wherein the temperature during extraction is maintained at about from 10° C. to just below about the boiling point of the ingredients at operating pressure.

4. The process of claim 2 wherein the contaminated sulfate solution was obtained from the manufacture of acrylonitrile or methacrylonitrile.

5. The process of claim 2 wherein ammonium sulfate is recovered from the aqueous phase by crystallization.